United States Patent
Contreras et al.

(10) Patent No.: US 8,233,240 B2
(45) Date of Patent: *Jul. 31, 2012

(54) MAGNETIC RECORDING DISK DRIVE WITH INTEGRATED LEAD SUSPENSION HAVING MULTIPLE SEGMENTS FOR OPTIMAL CHARACTERISTIC IMPEDANCE

(75) Inventors: John Thomas Contreras, Palo Alto, CA (US); Luiz M Franca-Neto, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 370 days.

This patent is subject to a terminal disclaimer.

(21) Appl. No.: 12/635,606

(22) Filed: Dec. 10, 2009

(65) Prior Publication Data

US 2011/0141626 A1 Jun. 16, 2011

(51) Int. Cl.
G11B 5/48 (2006.01)
G11B 21/16 (2006.01)

(52) U.S. Cl. ............ 360/245.9; 360/246

(58) Field of Classification Search .......... 360/245.8, 360/245.9, 246, 264.2
See application file for complete search history.

(56) References Cited

U.S. PATENT DOCUMENTS

| | | | |
|---|---|---|---|
| 5,712,749 A | 1/1998 | Gustafson | |
| 5,737,152 A | 4/1998 | Balakrishnan | |
| 5,995,328 A | 11/1999 | Balakrishnan | |
| 6,275,358 B1 | 8/2001 | Balakrishnan et al. | |
| 6,300,846 B1* | 10/2001 | Brunker | 333/1 |
| 6,493,190 B1* | 12/2002 | Coon | 360/245.9 |
| 6,731,467 B1 | 5/2004 | Balakrishnan | |
| 6,762,913 B1 | 7/2004 | Even et al. | |
| 6,791,429 B2 | 9/2004 | Mikalauskas | |
| 6,900,967 B1* | 5/2005 | Coon et al. | 360/245.9 |
| 7,352,535 B2 | 4/2008 | Arya et al. | |
| 7,417,818 B2 | 8/2008 | Yuuki et al. | |
| 8,094,413 B1* | 1/2012 | Hentges et al. | 360/245.9 |
| 2004/0027725 A1* | 2/2004 | Pan et al. | 360/245.3 |
| 2006/0158785 A1 | 7/2006 | Arya et al. | |
| 2007/0133128 A1* | 6/2007 | Arai | 360/245.9 |
| 2008/0273269 A1* | 11/2008 | Pro | 360/234.6 |
| 2011/0149441 A1* | 6/2011 | Alex et al. | 360/245.8 |

* cited by examiner

Primary Examiner — Jefferson Evans
(74) Attorney, Agent, or Firm — Thomas R. Berthold

(57) ABSTRACT

An integrated lead suspension (ILS) in a magnetic recording disk drive has the transmission line portion of the ILS between the flex cable and the gimbal formed of multiple interconnected segments, each with its own characteristic impedance. At the interface between any two segments there is a change in the widths of the electrically conductive traces of the transmission line. The change in impedance of a fixed-length segment is a function of the change in its trace width. The number of segments and their characteristic impedance values are selected to produce the largest frequency bandwidth with a substantially flat group delay from the write driver to the write head.

10 Claims, 8 Drawing Sheets

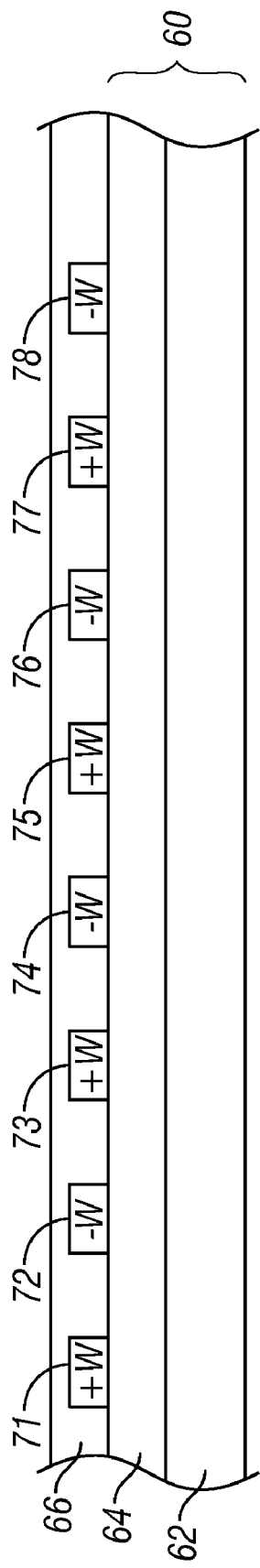
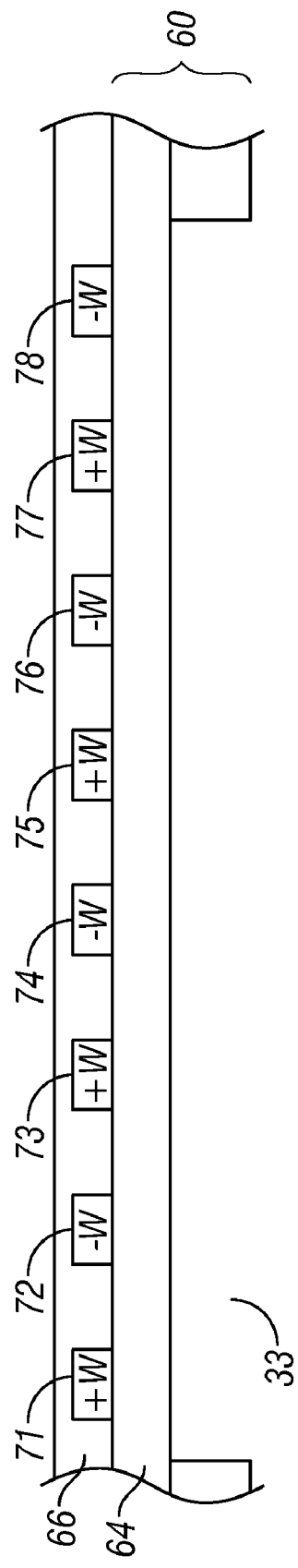
FIG. 2B (Prior Art)
FIG. 2C (Prior Art)

MAGNETIC RECORDING DISK DRIVE WITH INTEGRATED LEAD SUSPENSION HAVING MULTIPLE SEGMENTS FOR OPTIMAL CHARACTERISTIC IMPEDANCE

BACKGROUND OF THE INVENTION

1. Field of the Invention

The invention relates generally to an integrated lead suspension (ILS) for connection of read/write circuitry to the read/write head in a magnetic recording hard disk drive (HDD), and more particularly to an ILS with optimal characteristic impedance.

2. Description of the Related Art

In magnetic recording HDDs, the read/write head is formed on an air-bearing slider that rides on a thin film of air above the rotating disk. A mechanical suspension comprised of a flexure with a gimbal at its end connects the slider to the disk drive's actuator arm. The slider is attached to the gimbal which allows for slight movement on the air bearing as the disk rotates.

Electrical connection is required from the read/write circuitry, typically a read pre-amplifier/write driver module or chip, through a flex cable and suspension to the read and write elements on the slider. A suspension that integrates the mechanical connection with the electrical connection is called an integrated lead suspension (ILS) that is connected between the flex cable and the gimbal. A typical ILS is a generally flexible laminate of a conductive metal substrate like stainless steel, an insulating dielectric layer like polyimide, and electrically conductive copper lines or traces patterned on the dielectric layer.

The write driver circuitry typically provides a single-point input to the ILS for each of the positive and negative write signals (+W and −W). The write driver circuitry provides current through the ILS and then to the write element or head. The write driver circuitry power supply voltage and performance of the current through the write head depends on the characteristic impedance of the ILS. The write driver circuitry is required to supply signals with a wide frequency band, which requires optimizing the characteristic impedance of the ILS. However, there are physical constraints in the design of the ILS that become challenges to achieve the optimal characteristic impedance. For example, the flex cable and gimbal may both have fixed impedances of unfavorable values and the ILS may have a fixed length, which present difficulties in optimizing the characteristic impedance of the ILS. Moreover, capacitive loading at pads and vias along the ILS may also add non-negligible lumped disturbances to the wideband signals transmitted from the write driver circuitry to the write head.

What is needed is a HDD with an ILS with optimal characteristic impedance and a method for designing the ILS to have optimal characteristic impedance for wideband signal integrity under various physical constraints.

SUMMARY OF THE INVENTION

The invention relates to an integrated lead suspension (ILS) in a magnetic recording disk drive wherein the transmission line portion of the ILS between the flex cable and the gimbal has a fixed length and is made up of multiple interconnected segments, each with its own characteristic impedance. At the interface between any two segments there is a change in the widths of the electrically conductive traces. The change in impedance of a fixed-length segment is a function of the change in its trace width. The number of segments and their characteristic impedance values are selected to produce the largest frequency bandwidth with a substantially flat group delay from the write driver to the write head.

For a fuller understanding of the nature and advantages of the present invention, reference should be made to the following detailed description taken together with the accompanying figures.

BRIEF DESCRIPTION OF THE DRAWINGS

FIG. 2B is an expanded sectional view through section 2B-2B of the ILS in FIG. 2A to illustrate its laminated construction.

FIG. 2C is an expanded sectional view through section 2C-2C of the ILS in FIG. 2A and illustrates a window or gap in the ILS.

DETAILED DESCRIPTION OF THE INVENTION

Figure 1:
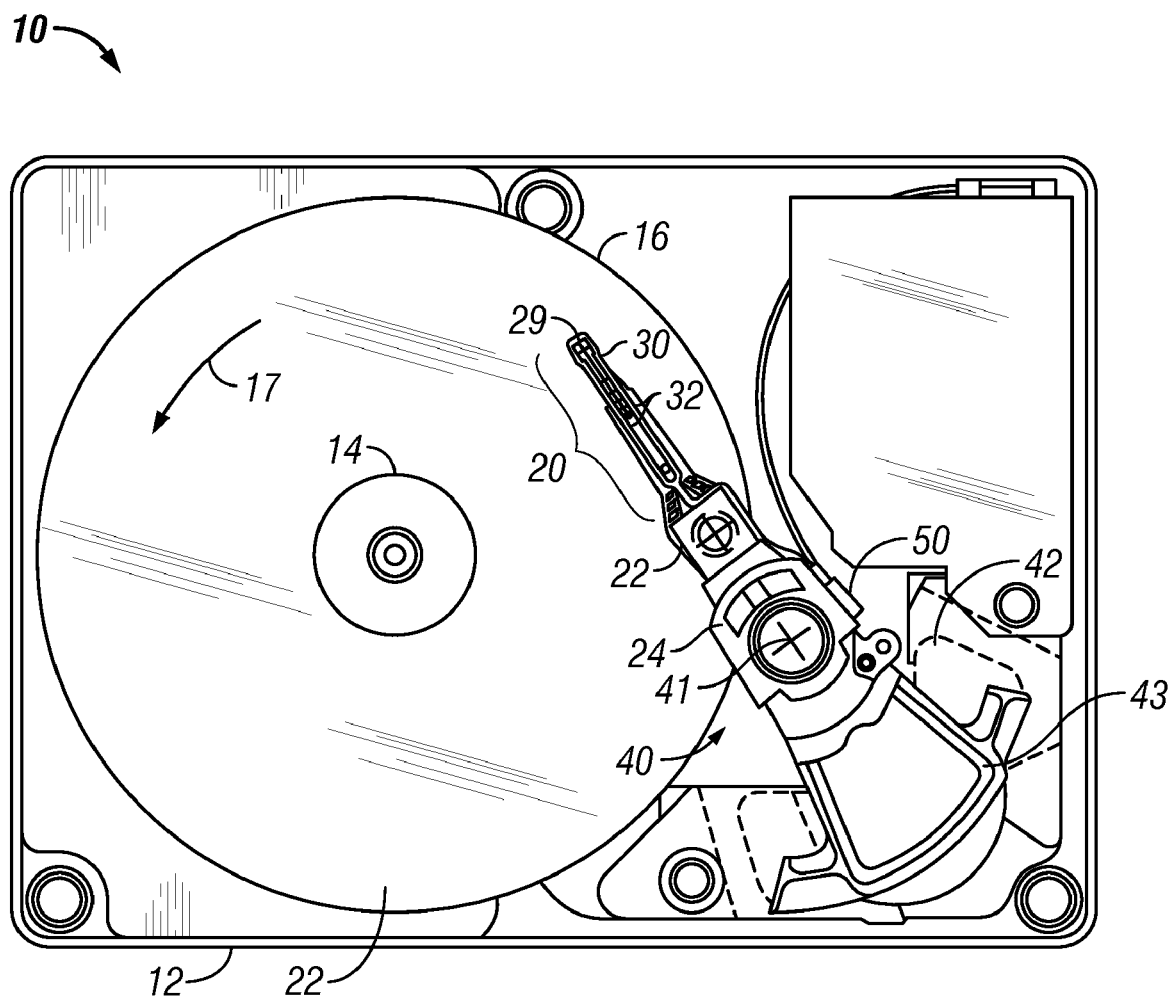
FIG. 1 is a top plan view of a head/disk assembly (HDA) of a hard disk drive and illustrates an integrated lead suspension (ILS) having an electrical trace interconnect array according to the prior art.

FIG. 1 is a top plan view of a head/disk assembly (HDA) of a hard disk drive 10. The hard disk drive 10 has at least one load beam assembly 20 having an integrated lead suspension (ILS) or flexure 30 with an array 32 of electrically conductive interconnect traces or lines that connect to a read/write head 29. The load beam assemblies 20 are attached to rigid arms 22 connected to an E-block 24. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier/write driver circuit.

Figure 2A:
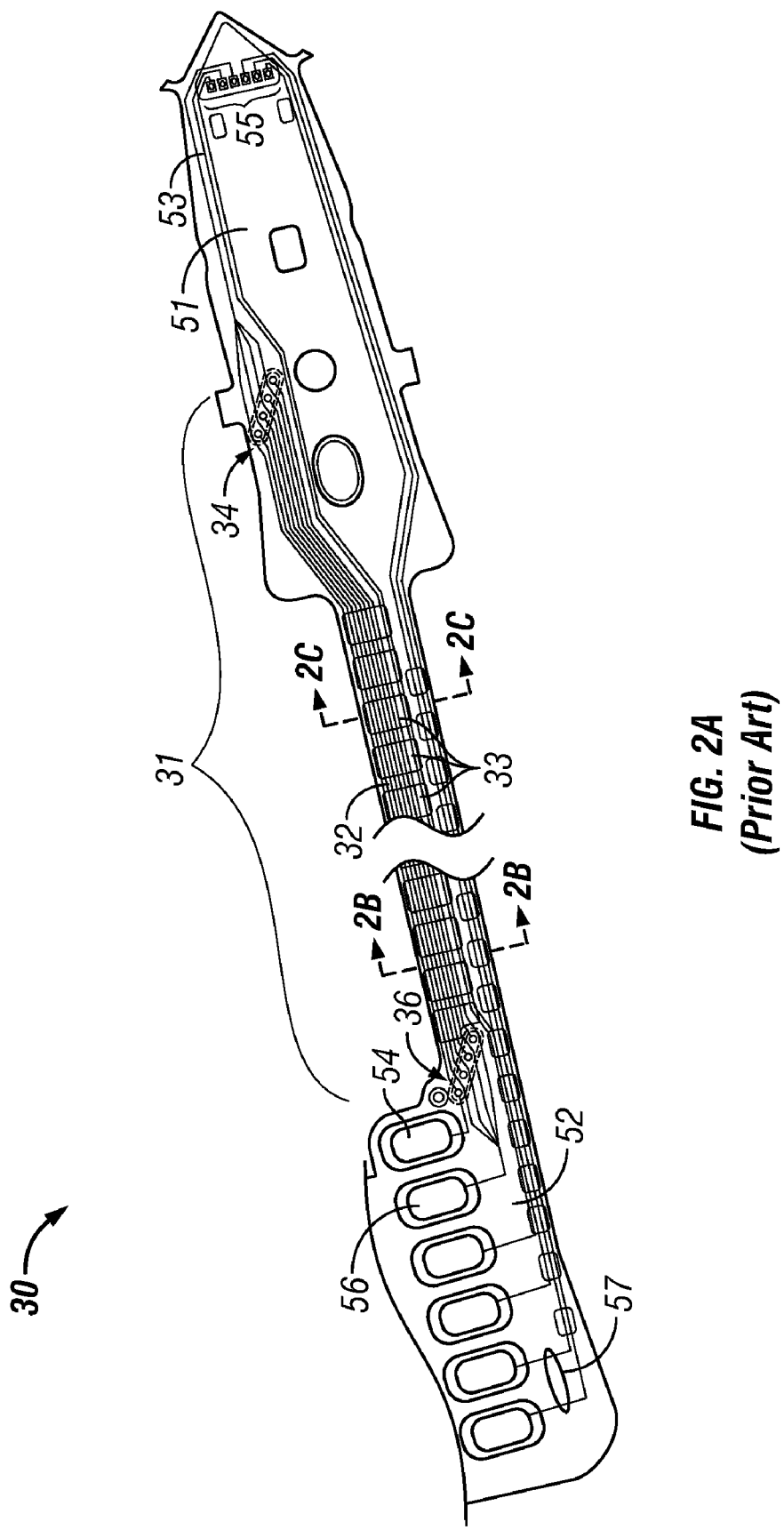
FIG. 2A is a plan view of the ILS showing the transmission line between the flex cable pad portion and the gimbal portion according to the prior art.

FIG. 2A is a plan view of the ILS 30 showing a transmission line segment 31 between a gimbal portion 51 and a flex cable pad portion 52. The ILS 30 is a laminate comprised of three layers: a conductive substrate, an insulating dielectric layer, a conductive layer for the electrical traces or lines, and an optional insulating dielectric cover layer. The gimbal portion 51 supports a slider (not shown) that contains the read/write heads 29 (FIG. 1) and has conductive traces 53 leading to pads 55 for electrical connection to pads on the slider. The ILS 30 has an electrical connection end 34 that is connected to traces 53 on gimbal portion 51. The flex cable pad portion 52 has a plurality of electrical connection pads, like pads 54, 56 that are electrically connected to chip 50 (FIG. 1). The ILS 30 has an electrical connection end 36 that is connected to pads 54, 56 on flex cable pad portion 52. A plurality of interleaved electrically conductive traces or lines 32, extend generally parallel to one another along the body or transmission line segment 31 of the ILS 30 between the flex cable pad portion 52 and the gimbal portion 51. The lines 32 connect the write driver in chip 50 with the write head on the slider attached to gimbal end 51.

FIGS. 2B and 2C are sectional views of the transmission line segment 31 showing the trace interconnect array of lines 32 (FIG. 2A) grouped as a first set of lines 71, 73, 75, 77 and a second set of lines 72, 74, 76, 78. The lines 71-78 are typically formed of copper and are illustrated as carrying differential write signals (+W and −W) with the signals being interleaved. The ILS 30 also includes conductive traces or lines 57 (FIG. 2A) that connect the read preamplifier in chip 50 with the read head on the slider attached to gimbal end 51.

FIG. 2B is an expanded sectional view through section 2B-2B of transmission line segment 31 in FIG. 2A and shows its laminated construction. The transmission line segment 31 includes a generally planar support member 60, a plurality of interleaved electrically conductive traces or lines, like lines 71, 73, 75, 77 in a first set and lines 72, 74, 76, 78 in a second set, and an optional insulating dielectric cover layer 66. The lines 71-78 carry differential write signals (+W and −W) with the signals being interleaved. The support member 60 includes a conductive base or substrate 62, typically formed of metal like stainless steel, and an insulator layer 64, formed of a dielectric material like polyimide, between the traces 71-78 and substrate 62. The support substrate 62 is typically about 18 microns thick and the insulating dielectric layer 64 is typically about 10 microns thick. The optional dielectric cover layer 66 is also typically formed of polyimide to a thickness of about 15 microns over the tops of the lines 71-78.

The transmission line segment 31 also includes a plurality of windows or gaps 33 in substrate 62 of the laminate, as shown in FIG. 2A. This is illustrated in FIG. 2C, which is sectional view of section 2C-2C of FIG. 2A. In the gaps there is no stainless steel below the dielectric layer 64. The gaps reduce the signal losses caused by the conductive substrate 62. The interleaving, the conductive substrate 62, and windows or gaps 33 allow for a wider adjustment of the interconnect characteristic impedance $Z_0$ of transmission line segment 31.

Figure 3:
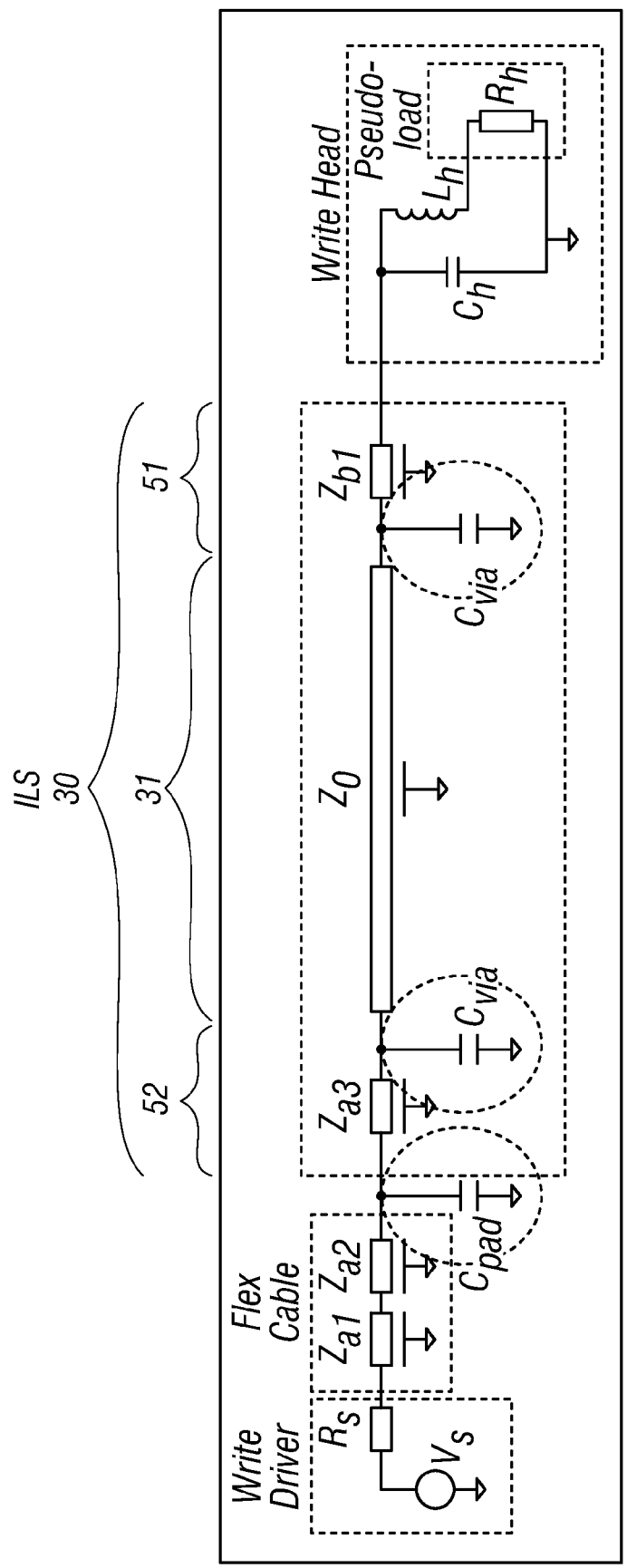
FIG. 3 is a schematic representation of the differential signal mode and illustrates the impedance contributions to the interconnect between the write driver circuitry and the write head according to the prior art and shows the fixed-length stretch of transmission line of the ILS with characteristic impedance $Z_0$.

FIG. 3 is a schematic illustration of the impedance contributions to the interconnect between the write driver circuitry and the write head. The write driver circuitry has a source resistance $R_s$ and a source voltage $V_s$ and the inductive write head has its ohmic and magnetic losses lumped on an effective load resistor $R_h$. The write drive circuitry is required to supply a wideband signal, typically with relevant frequency content from as low as 0.1 GHz up to 3.0 GHz or higher in future higher data rate hard disk drive systems. The write driver circuitry is connected to a flex cable, which is connected to the flex cable pad portion 52 of ILS 30. These portions of the interconnect contribute impedances represented as $Z_{a1}$ to $Z_{a3}$ that are generally fixed and cannot be altered to optimize the total impedance. Parasitic capacitances $C_{pad}$ due to pads, like pads 56 (FIG. 2A), and parasitic capacitances $C_{via}$ due to vias to the interleaved traces in section 31 of the ILS are represented as lumped components. Similarly, the write head is connected to the gimbal portion 51 of ILS 30. This portion of the interconnect contributes an impedance represented as $Z_{b1}$ that is generally fixed and cannot be altered to optimize the total impedance. Parasitic capacitances $C_{via}$ due to the vias to the interleaved traces in section 31 contribute to $Z_{b1}$. Thus, in the prior art interconnect of FIG. 3, only the transmission line 31 can have its characteristic impedance $Z_0$ optimized for transmission of the wideband signal. However, the transmission line 31 has a fixed length. The longer this stretch of transmission line 31, the larger can be the effect of this stretch on the overall performance of the interconnects from the write driver to the write head. The characteristic impedance $Z_0$ should be optimized to ensure the transmission of the desired frequency bandwidth for the signal with a flat group delay. Group delay is a measure of the time rate of change it takes signals to traverse a transmission line. Group delay is a function of frequency, the length of the transmission line, and the impedance along the interconnect. Group delay is typically measured in pico-seconds for typical transmission lengths used in HDDs. As used herein, a substantially flat group delay means that all frequencies of a wide frequency band signal have a group delay that is within some allowed deviation from a base group delay value, normally taken as the group delay at the lowest frequencies of interest. For example, for a frequency bandwidth of 0.1 GHz to 3.0 GHz, a substantially flat group delay may be one in which the group delays for all frequencies are within a certain percentage, e.g., 1, 5 or 10 percent, of the group delay for the low frequency, i.e., 0.1 GHz, or another value depending on the requirements of the specific write driver signals used.

The prior art methods for improving the signal quality form the write driver to the write head focused on equalizing the effect of the various portions making up the complete signal path. These methods included adjusting the characteristic impedances of the flex cable and the gimbal portion. However, because of physical limitations in these areas, the adjustments were limited in terms of impedance values that could be achieved without major changes in manufacturing. In addition, the capacitance values for $C_{pad}$ and $C_{via}$ were purposefully augmented with extra capacitance, for example by adding more metal to the traces by making them wider at the respective capacitor areas In this invention the transmission line 31 is replaced with a multiple-segment transmission line 131, wherein each segment has its own characteristic impedance. A multiple-segment transmission line for the purpose of adjusting the write current overshoot pulses is described in U.S. Pat. No. 7,417,818 B2. To achieve the required overshoot, the first segment, the one that connects to the write driver, is required to have an impedance $Z_{01}$ that matches the impedance $Z_{WD}$ of the write driver, and each successive segment from the first segment to the segment that connects to the write head is required to have a successively smaller impedance.

Figure 4:
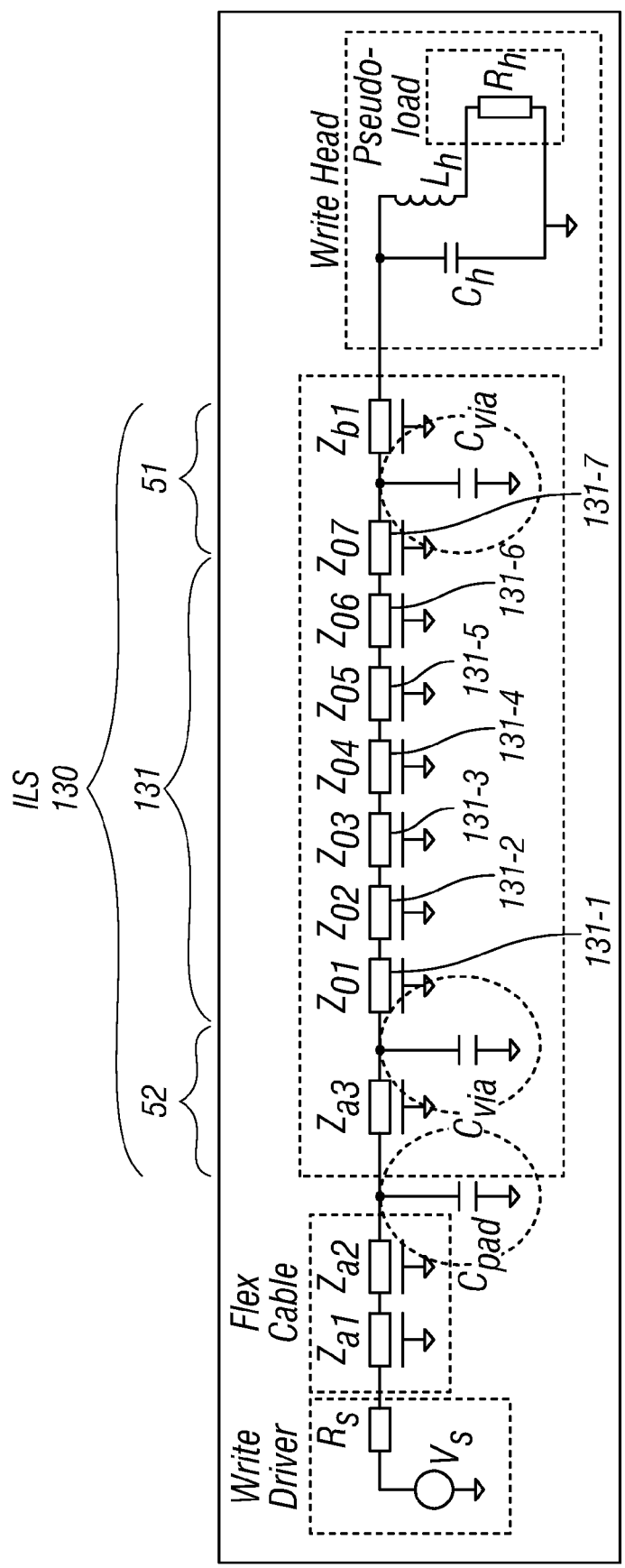
FIG. 4 is a schematic representation of the differential signal mode and illustrates the impedance contributions to the interconnect between the write driver circuitry and the write head according to the invention and shows the fixed-length transmission line of the ILS with multiple transmission line segments, each with its characteristic impedance.
Figure 5:
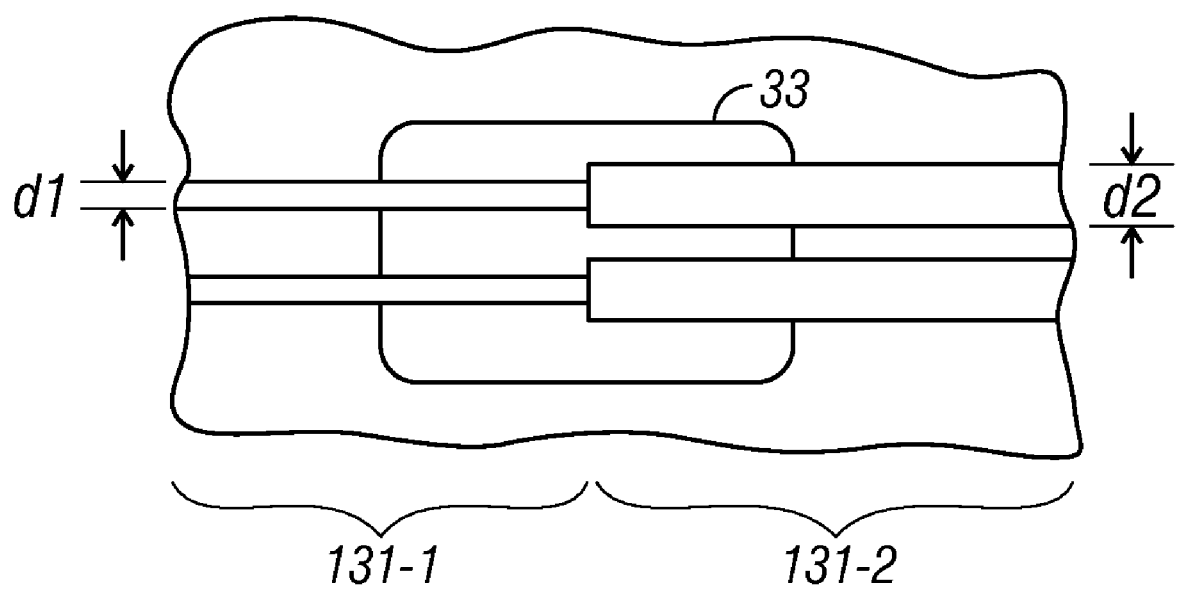
FIG. 5 is an illustration of the interface between two transmission line segments over a windowed metal backplane according to the invention.

In this invention, as will be described later, the method to find the optimal characteristic impedances for the multiple segments is very different from the prior art, but it will be recognized that a stretch of transmission line with a single characteristic impedance (FIG. 3) is the special case of the multiple-segment transmission line (FIG. 4) when all the segments have the same characteristic impedance. FIG. 4 is a schematic illustration of the impedance contributions of the individual transmission line segments to the interconnect between the write driver circuitry and the write head according to this invention. In FIG. 4 the ILS 130 is depicted with a transmission line 131 having seven segments (131-1 to 131-7) with characteristic impedances $Z_{01}$ to $Z_{07}$, respectively. However, the invention is not limited to a specific number of segments. At the interface between any two segments there is a change in the widths of the traces. This is depicted in FIG. 5, which is a typical interface between segment 131-1 and 131-2, which is made over a window 33, and shows segment 131-1 with trace widths d1 and segment 131-2 with trace widths d2. The change in impedance of a fixed-length segment is a function of change in its trace width. Thus if 131-1 and 131-2 had d2 larger than d1, then $Z_{02}$ would be smaller than $Z_{01}$, where $Z_{01}$ and $Z_{02}$ are the characteristic impedances of the transmission line segments that contain 131-1 and 131-2, respectively. In this invention the number of segments and their characteristic impedance values are selected to produce the largest bandwidth with a substantially flat group delay from the write driver to the write head. The resistor $R_h$ in the write head model is the load element to which the signals from the write driver need to be delivered.

A method for systematically selecting the number of transmission line segments and their characteristic impedances to provide the largest bandwidth with substantially flat group delay from write driver to resistor $R_h$ will be explained with respect to the flowchart of FIG. 6. The method can be performed with the use of commercially available software, like Microwave Office® from Applied Wave Research, which perform calculations of impedances, bandwidth and group delay.

First, in block 300, set the values $V_s$, $R_s$ and $R_h$, and the values of impedances $Z_{a1}$ to $Z_{a3}$ and $Z_{b1}$ for the flex cable and the connections to the flex cable pad 52 and portion and gimbal portion 51. Also set the values of $C_{pad}$, the $C_{via}$ values, and the values for $C_{par}$ and $L_h$. These values are known or calculated from the specific write driver, head and flex cable designs. Then in block 305, calculate the optimal characteristic impedance $Z_0$ for a single-segment (N=1) transmission line for the total length of transmission line 131. This would be the value of $Z_0$ that results in the maximum frequency bandwidth with flat group delay. Save the maximum bandwidth achieved (BW(N) for N=1)

Next, in block 310, increase the number of segments by 1 (N=N+1).

In block 315, sets of values for $[Z_{01}\text{-}Z_{0N}]$ are searched to find the set that produces the largest bandwidth with substantially flat group delay. There are many optimization algorithms and strategies that may be used to find the optimal impedance sets of values $[Z_{01}\text{-}Z_{0N}]$, such as Gradient, Simplex, and including trial and error. For example, for each value of N for N equal to or greater than 2, for the first try the N segments can be selected to have substantially the same length and the values $[Z_{01}\text{-}Z_{0N}]$ then calculated. For subsequent tries, the lengths of the N segments can be selected to be different. The set $[Z_{01}\text{-}Z_{0N}]$ that produces the largest bandwidth with substantially flat group delay is found and saved. The maximum bandwidth obtained with this current number of segments is also saved.

At block 320 $BW_{max}(N)$ is tested against $BW_{max}(N-1)$. If $BW_{max}(N)$ is greater than the previously calculated $BW_{max}(N-1)$ (YES at block 320 output) then the process returns to block 310 with the number of segments incremented by 1 and the process continues. If $BW_{max}(N)$ is less than the previously calculated $BW_{max}(N-1)$ (NO at block 320 output), then this indicates that the best result for maximum frequency bandwidth ($BW_{max}$) has been achieved for the tested N-1 segment case, and the values $[Z_{01}$ to $Z_{0(N-1)}]_{max}$ are retrieved and used as the characteristic impedance values for the N-1 segments (block 325). The normal termination (NO at block 320 output) would occur at K=N+1. However, a practical limit can be set for the number of segments to terminate the process and the best result at that point will be used as best result for the design. This limit on the number of segments can be established as a function of the total length available for the transmission line segments and maximum relevant frequency (smaller wavelength in the transmission line) of signal used in the final design. That is because with lengths smaller than a small fraction of the wavelength, fraction of ¹/₁₀ or ¹/₂₀, there will be negligible transmission line effects on the transmission line segments.

Figure 6:
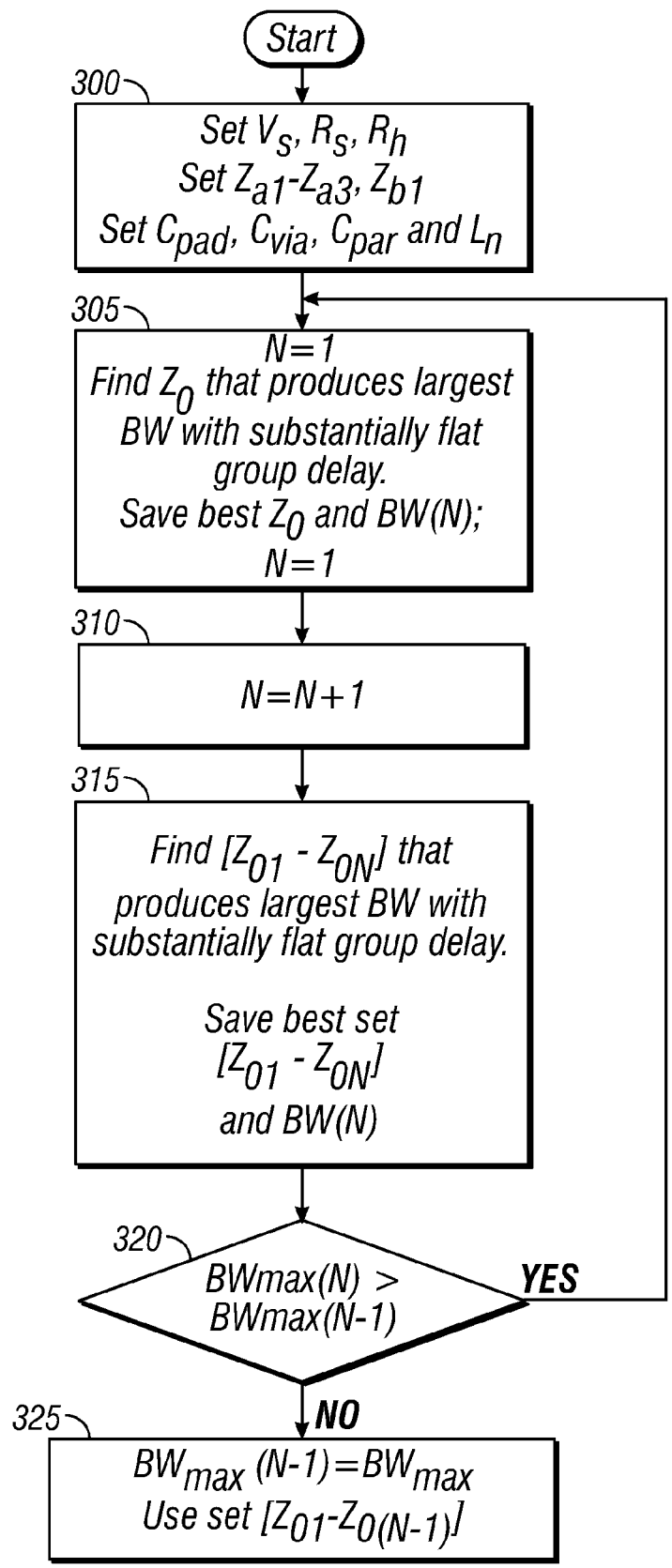
FIG. 6 is a flowchart illustrating a method for selecting the number of transmission line segments and their characteristic impedances in the ILS's fixed-length transmission line stretch to provide an optimized total characteristic impedance for the multiple-segment transmission line according to the invention.

The method of FIG. 6 is but one algorithm to select the number and optimal set of impedance values. Variations of this method are possible. Since the smallest usable transmission line segment length can be determined from the total length available and the maximum relevant frequency of the signals to be transmitted, the maximum number of segments to be experimented with can be determined. Thus, all numbers of segments from 1 to this maximum number could be tried to find the best solution. Moreover, the actual algorithm that tries the sets of values $[Z_{01}\text{-}Z_{0N}]$ can be any of the algorithms used to solve numeric optimization problems.

Also, the method can be modified such that whenever the algorithm finds two or more segments of transmission line in sequence with substantially the same characteristic impedance these segments can be realized as single stretch of transmission line with that same characteristic impedance. Such realization will make the final design appear to have segments of unequal lengths. Also, the values of characteristic impedances to be tested can be limited to value ranges which are manufacturable.

Figure 7:
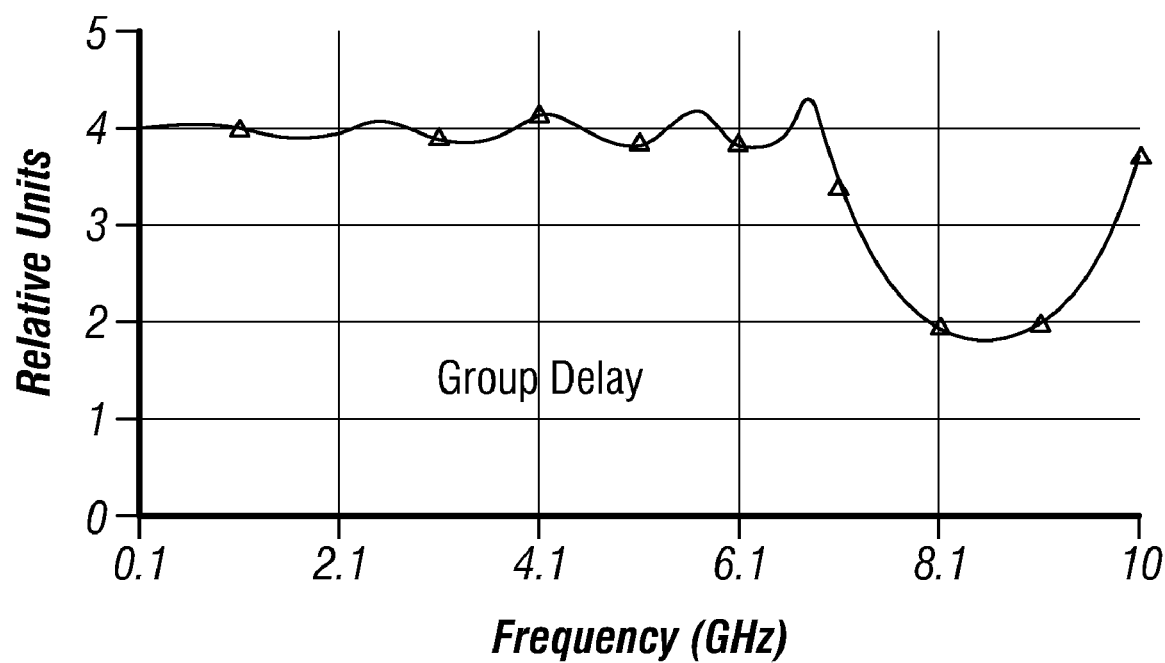
FIG. 7 is an example of a group delay graph for an interconnect with a multiple-segment transmission line according to the invention.

FIG. 7 is an example of a group delay graph for an interconnect with a multiple-segment transmission line according to this invention. The transmission line had a fixed length of 35 mm. The method in the flowchart of FIG. 6 resulted in the selection of seven segments (N=7), with the segment lengths selected to be equal, each with a length of 5 mm. The values of $Z_{01}$ to $Z_{07}$, as determined by use of the method in the flowchart of FIG. 6, were 79, 38, 79, 38, 80, 40 and 84Ω, respectively. In designing the transmission line, the individual values of impedances $Z_{01}$ to $Z_{07}$ are obtained by proper design of the widths of the traces for each individual segment, as illustrated by FIG. 5. As shown by FIG. 7, this resulted in a maximum frequency bandwidth with flat group delay of approximately 0.1 GHz to 6.1 Ghz.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. In a magnetic recording disk drive having write driver circuitry having a source voltage $V_s$ and an inductive write head, an integrated lead suspension (ILS) for electrical connection of the write driver circuitry to the write head, the ILS comprising:

a flex cable portion for connection to the write driver circuitry and having a fixed characteristic impedance;

a gimbal portion for connection to the write head and having a fixed characteristic impedance; and a fixed-length transmission line connecting the flex cable portion and the gimbal portion and comprising N transmission line segments, where N is an integer greater than or equal to 3, each segment having a characteristic impedance with at least three of the segments having different impedances, wherein the impedances of successive segments from the flex cable portion to the gimbal portion do not successively decrease in value; and wherein the signal from the write driver circuitry to the write head is transmitted at a predetermined frequency bandwidth between a low and a high frequency and the characteristic impedances of the N segments results in a substantially flat group delay for the signal from the write driver circuitry to the write head at frequencies across said predetermined frequency bandwidth, said substantially flat group delay being that the group delay across said predetermined frequency bandwidth does not deviate by more than 10 percent of the group delay at said low frequency.

2. The ILS of claim 1 wherein the N segments have substantially the same length.

3. The ILS of claim 1 wherein the N segments have different lengths.

4. The ILS of claim 1 wherein the transmission line comprises a plurality of electrically conductive traces, and wherein the width of the traces of a first segment is different from the width of the traces of a second segment connected to said first segment.

5. The ILS of claim 4 wherein the width of the traces of each segment is different from the width of the traces of segments connected to each said segment.

6. The ILS of claim 1 wherein said predetermined frequency bandwidth is between about 0.1 GHz and 3.0 GHz, and wherein the group delay across said predetermined frequency bandwidth does not deviate by more than 10 percent of the group delay at 0.1 GHz.

7. The ILS of claim 1 wherein N is 7, wherein said predetermined frequency bandwidth is between about 0.1 GHz and 6.1 GHz, and wherein the group delay across said predetermined frequency bandwidth does not deviate by more than 10 percent of the group delay at 0.1 GHz.

8. An integrated lead suspension (ILS) for electrical connection of write driver circuitry to a write head in a magnetic recording disk drive, the ILS comprising:

a flex cable portion for connection to the write driver circuitry and having a fixed characteristic impedance;

a gimbal portion for connection to the write head and having a fixed characteristic impedance; and a fixed-length transmission line having a plurality of electrically conductive traces connecting the flex cable portion and the gimbal portion and comprising N transmission line segments, where N is an integer greater than or equal to 2, each segment having a characteristic impedance, and wherein the width of the traces of each segment is different from the width of the traces of segments connected to each said segment; and wherein the signal from the write driver circuitry to the write head is transmitted at a predetermined frequency bandwidth between about 0.1 GHz and 3.0 GHz and wherein the characteristic impedances of the N segments results in a group delay across said predetermined frequency bandwidth that does not deviate by more than 10 percent of the group delay at about 0.1 GHz.

9. A method for optimizing the characteristic impedance of an integrated lead suspension (ILS) that electrically connects the write driver circuitry of a magnetic recording disk drive to the inductive write head of a magnetic recording disk drive, wherein the signal from the write driver circuitry at a source voltage $V_s$ to the inductive write head with losses represented in a resistor $R_h$ is transmitted at a predetermined frequency bandwidth and wherein the ILS includes a flex cable portion having a fixed characteristic impedance connected to the write driver circuitry, a gimbal portion having a fixed characteristic impedance connected to the write head, and a fixed-length transmission line connecting the flex cable portion and the gimbal portion, the method comprising:

for each integer beginning with N=2 and increasing by 1, determine the set of characteristic impedances $Z_{01}$ to $Z_{0N}$ of each of N transmission line segments that results in the largest frequency bandwidth with a group delay across said largest frequency bandwidth that does not deviate by more than 10 percent of a base group delay value;

terminating said determination when the frequency bandwidth for a N-segment transmission line is less than the frequency bandwidth for the (N−1)-segment transmission line; and selecting the set of characteristic impedances $Z_{01}$ to $Z_{0(N-1)}$ of said N−1 segments as the set that results in the greatest frequency bandwidth.

10. The method of claim 9 wherein said predetermined frequency bandwidth for the signal from the write driver circuitry is between about 0.1 GHz and 3.0 GHz, and said predetermined flat group delay being that the group delay does not deviate by more than 10 percent of the group delay at 0.1 GHz.

* * * * *